Dec. 15, 1931.  N. K. CHANEY  1,836,903
VENT FOR ELECTRIC BATTERY CELLS
Filed July 23, 1927
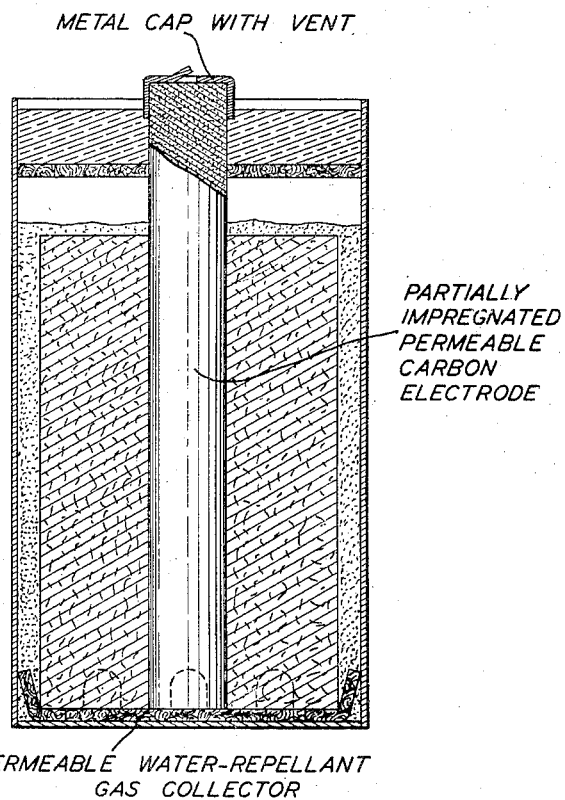
INVENTOR:
Newcomb K. Chaney,
BY
Byrnes Townsend + Brickenstein,
ATTORNEYS.

Patented Dec. 15, 1931

1,836,903

UNITED STATES PATENT OFFICE

NEWCOMB K. CHANEY, OF LAKEWOOD, OHIO, ASSIGNOR TO NATIONAL CARBON COMPANY, INC., A CORPORATION OF NEW YORK

VENT FOR ELECTRIC BATTERY CELLS

Application filed July 23, 1927. Serial No. 207,955.

The invention relates to electric battery cells of the type enclosed in a water-proof envelope, and it consists in a cell construction which provides a vent of regulated capacity serving to void the gases liberated within the envelope.

By far the most common cell of the type to which the invention relates is the so-called dry cell, which is so encased as to prevent evaporation of its water content and to prevent efflux of liquid regardless of the position in which the cell is placed. For purposes of illustration the invention will be described as applied to dry cells.

In dry cells of usual construction the envelope of the cell consists principally of the anode of the cell, which is a zinc cup. One end of the cup is closed by a plastic seal, practically impervious to gases, and the carbon electrode or cathode projects through this seal, the protruding end often being covered by a metal cap having its edge embedded in the seal. The voiding of gases from such a cell does not take place in a wholly satisfactory manner, and it is more the result of accident than design that a tolerable venting is attained.

With the construction just described the gases escape for the most part through the joint between the seal and the zinc cup. The primary object of this seal is to maintain the seal and attached parts in proper relation to the zinc cup, and there can be no modification of the joint for venting purposes which will endanger this function. If the plastic seal is made softer it will bulge under the influence of excessive pressures within the cell, and if it is made more rigid it will under the same conditions be ejected bodily from the zinc cup. Making the joint either closer or looser aggravates the difficulty since the one expedient diminishes the venting and increases the gas pressure within the cell while the other impairs the mechanical strength of the joint. Furthermore moisture escapes through the joint with the gases, and air enters as the cell "breathes" under variable conditions of temperature and usage. The joint is not a vent of the proper character to minimize these two undesirable effects.

I have discovered that venting may be better controlled and is more adequate and effective if it takes place through the carbon electrode.

The carbon rods now employed as electrodes in dry batteries are sufficiently porous for venting purposes, but require special treatment to enable them to maintain their permeability when in contact with the electrolyte. The carbons have no specific retentivity for moisture, but take up moisture by capillary attraction. The smallest capillaries attract water most strongly and are least useful for venting, and it is therefore desirable to fill them by an impregnating operation. The impregnation must not be complete or the permeability of the carbons will be destroyed. Partial impregnation may be conveniently effected by saturating the carbons with a solution of non-volatile impregnating agent, such as lubricating oil, in a volatile solvent, such as carbon tetrachloride or naphtha, and then evaporating the solvent. By varying the composition of the solution, the permeability of the treated carbons may be controlled, the carbons being in any event rendered water-repellent. By way of example I mention a mixture containing 10% of medium viscosity lubricating oil with the balance volatile solvent.

I have also discovered that venting may be improved if the carbon electrode vent is used in conjunction with a permeable water-repellent gas collector within the cell and in proximity to the carbon. The collector offers a low resistance path for gases liberated or collecting at points remote from the carbon but contiguous to the collector, and conducts these gases to the carbon. The collector should be water-repellent in order to maintain its permeability.

A disc of partially impregnated pulp board in the bottom of the cell near the lower end of the carbon forms a simple and effective gas collector. It may be prepared by the method described for partially impregnating the carbons. Another method which I have found satisfactory is to fully impregnate a number of discs with paraffine or the like, stack them alternately with unimpregnated discs, and then heat the stack until the impregnating agent distributes itself more or less uniformly among all the discs. The gas collecting disc may be placed in the bottom of the cup. If the bottom of the cup is otherwise lined the gas collector is preferably placed on top of the other lining so that it may better coact with the carbon electrode.

Dry cells, especially those of the smaller sizes used in flashlights, usually have the protruding ends of their carbon electrodes covered by metal caps embedded in the seal. Obviously such a cap would interfere if the carbon is used for venting, and the cap should be perforated to permit gases to pass through it.

In perforating the cap, a tongue of the metal may be struck up from the upper surface of the cap in such manner that it will serve to make contact with the zinc of the next cell when several cells are axially alined. Such a contact is described and claimed in the patent to Jones No. 1,596,188, issued August 17, 1926. A perforation equally useful for venting purposes can of course be located in the side of the metal cap.

With an independent venting system so effective and controllable as that described, it is evident that the joints between the plastic seal and its areas of contact with other cell parts may be relieved entirely of their venting function, and confined to those of remaining permanent in tightness and in mechanical strength and position. This widens very advantageously the scope of available sealing materials, and permits the selection of sealing compounds of a greatly increased degree of suitability for their restricted functions. The overall effect of the combination of independent venting and sealing systems is to permit of a nice adjustment of the degree of venting to practical requirements with a minimum of that excess which results in impairment of cell efficiency through moisture loss and other effects.

The accompanying drawing with its legend shows an embodiment of the invention.

I claim:

1. An electric battery cell having an envelope, a cathode serving also to void gases from said envelope, and a disc of gas-permeable fibrous material partially impregnated with a water-repellent material within the envelope to convey gases toward said cathode.

2. An electric battery cell having an envelope forming a gas-tight seal, a cathode projecting through said envelope and serving to void gases therefrom, and a perforated metal cap enclosing the portion of the cathode outside the envelope.

3. An electric battery cell having an envelope, a cathode projecting through said envelope and serving to void gases therefrom, a perforated metal cap enclosing the portion of the cathode outside the envelope, and a disc of gas-permeable fibrous material partially impregnated with a water-repellent material within the envelope to convey gases toward said cathode.

4. An electric battery cell having an envelope forming a gas-tight seal, a porous cathode projecting through said envelope, said cathode comprising a carbon rod impregnated with a water-repellent substance, said cathode serving to void gases from within the envelope, and a perforated metal cap enclosing the portion of the cathode outside the envelope.

In testimony whereof, I affix my signature.

NEWCOMB K. CHANEY.